United States Patent [19]

Beck et al.

[11] Patent Number: 4,468,740

[45] Date of Patent: Aug. 28, 1984

[54] VEHICLE WHEEL ANTI-SKID OR ANTI BRAKE-LOCK SYSTEM

[75] Inventors: Lothar Beck, Eberdingen; Eberhard Schnaibel, Hemmingen; Alfred Sigl, Sersheim, all of Fed. Rep. of Germany

[73] Assignee: Robert Bosch GmbH, Stuttgart, Fed. Rep. of Germany

[21] Appl. No.: 424,241

[22] Filed: Sep. 27, 1982

[30] Foreign Application Priority Data

Jan. 11, 1982 [DE] Fed. Rep. of Germany ....... 3200529

[51] Int. Cl.³ .............................................. B60T 8/08
[52] U.S. Cl. ..................................... 364/426; 303/92; 303/93; 303/95
[58] Field of Search ................... 364/426; 303/92, 105, 303/93, 103

[56] References Cited

U.S. PATENT DOCUMENTS 3,820,857 6/1974 Schnaibel et al. .................. 303/105

FOREIGN PATENT DOCUMENTS 1916518 4/1970 Fed. Rep. of Germany .
1780062 11/1971 Fed. Rep. of Germany .

Primary Examiner—J. V. Truhe
Assistant Examiner—Saul M. Bergmann
Attorney, Agent, or Firm—Frishauf, Holtz, Goodman & Woodward

[57] ABSTRACT

To reduce disturbance and interference signals, and particularly recurring disturbance signals due to vibration or out-of-round conditions of rotating elements coupled to a speed transducer, a low-pass filter (11) is connected to the speed transducer and, in addition, a high-pass filter (12) which, however, is disconnected upon sensing that the speed of the wheel or of the vehicle is below a predetermined limit, or that the anti brake-lock system unit (13) has responded. Thus, disturbance signals, and particularly periodic disturbance signal which might cause oscillatory conditions to arise in the filter and transducer circuitry, are effectively suppressed. To further increase the reliability of response, the output from the filter circuits is connected to threshold circuits with a variable threshold level in which comparators compare a peak signal with a weighted, then existing signal, so that the comparison level threshold is continuously shifted based on previously occurring peaks, so that disturbance signals are reliably excluded from affecting signal processing within the anti brake-lock system unit (13).

13 Claims, 3 Drawing Figures

VEHICLE WHEEL ANTI-SKID OR ANTI BRAKE-LOCK SYSTEM

REFERENCE TO RELATED PUBLICATIONS

German Patent Disclosure Document DE-OS 17 80 062, WEHDE et al.; German Patent Disclosure Document DE-OS 19 16 518, ATKINS (corresponding to U.S. patent application Ser. No. 716,709, filed Sept. 23, 1968).

The present invention relates to vehicle wheel anti-skid or anti brake-lock systems, and more particularly to such systems used in automotive vehicles in which wheel speed sensors provide output signals representative of wheel speed and rotation in order to provide derived signals, such as wheel acceleration or deceleration, vehicle speed, and the like.

BACKGROUND

Anti brake-lock or vehicle anti-skid systems utilize sensors coupled to the wheels. Such sensors are subject to mechanical disturbances, particularly vibrations, and may also respond by spurious signals to uncontrollable conditions in the transducer elements, such as out-of-round conditions of transducer components, and the like. Consequently, malfunction or interference with proper, controlled operation of the anti-skid system may occur. Vibrations and out-of-round conditions, particularly, may cause interference or disturbance signals which are within the frequency and/or amplitude range of the actual signal which is intended to be derived. If such disturbance signals are, erroneously, evaluated as actual wheel signals, malfunction of the anti-skid system may occur.

It has previously been proposed—see German Patent Disclosure Document DE-OS 17 80 062—to utilize filter circuits coupled to a speed transducer, in which the time constants of the filters are suitably selected to exclude, as far as possible, disturbance signals. Later, it was proposed—see German Patent Disclosure Document DE-OS 19 16 518 (based on U.S. application Ser. No. 716,709, filed Sept. 23, 1968, ATKINS, assigned Kelsey-Hayes Co.)—to construct filters which have low-pass characteristics utilizing an R/C series circuit arrangement.

It has been found that filters may, in connection with the remaining circuits in which they are used, form oscillatory systems if output signals from wheel rotation transducers are subjected to vibration or other recurring disturbances. If the circuit becomes oscillatory, disturbance and noise signals will be enhanced, which, in spite of other precautions taken to exclude disturbance signals, may lead to erroneous response, and hence malfunction of the anti-skid system.

THE INVENTION

It is an object to provide an anti-skid or anti brake-lock system in which disturbance effects, particularly recurring disturbance effects, are essentially eliminated.

In accordance with the invention, the filtering network includes two filters, in which the second one has a band-pass characteristic different from the first, preferably formed as a high-pass filter, whereas the first one is a low-pass filter; and controlled switching means are provided to selectively connect or disconnect the second filter in dependence on predetermined operating parameters, as represented by signals, which occur within or are available within the anti-skid system. Typically, the control signals which may selectively connect the second filter may be based on wheel speed, vehicle speed, or response of the wheel anti-lock system.

In accordance with a feature of the invention, the output from the system is conducted to a threshold sensing circuit in which the threshold level dynamically changes with level of the signal, so that the response of the threshold circuit will change with signal amplitude. If the signal amplitude increases, the response level of the threshold circuit, likewise, is increased, so that the threshold circuit will have a variable response level, following changes in amplitude of the signal to which it is to respond, so that the threshold level will remain a predetermined fraction of a signal level regardless of the amplitude of signal being applied thereto.

The system has the advantage of substantially improved noise signal rejection. Inherent resonance effects due to circuitry between the sensor or transducer element and the filter, and which may include the filter component, can be readily suppressed.

In accordance with a feature of the invention, the second, selectively connectable filter preferably is an R/C circuit element in which the resistance portion is selectively connectable, based on operating parameters such as vehicle or wheel speed, for example. Shifting the threshold level of a threshold detector in accordance with amplitude of the signal being applied thereto has the additional advantage that large output signals will exceed the threshold level by a predetermined percentage, rather than a predetermined fixed level, thus resulting in extremely good noise rejection.

DRAWINGS

DETAILED DESCRIPTION

Figure 1:
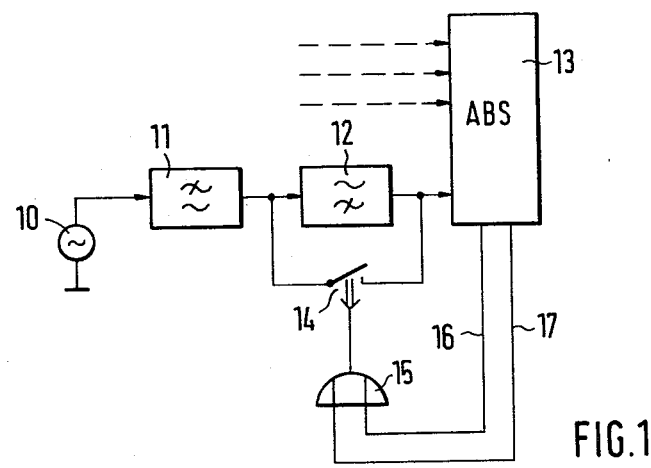
FIG. 1 is a general block diagram of an anti brake-lock system (ABS) including the present invention.

A wheel speed sensor 10 is coupled to the wheel of a vehicle. Such sensors or transducers, typically, are magnetic transducers which provide sine wave output signals upon passage of ferromagnetic elements in front of a pick-up coil. Other types of transducers may be used. The output signal of the vehicle rotation transducer is used in the automatic anti brake-lock control unit (ABS) 13 to derive from the signals from the transducers other signals representative of slip, speed, acceleration or deceleration of the respective wheel. Further signals can be derived therefrom, for example by averaging, and modifying, in accordance with known criteria, wheel speed signals in order to derive a vehicle speed signal. The various signals are processed—as well known—in the control unit 13 to provide output signals representative of control action, and if the control unit 13 should respond at all.

Each one of the wheel transducers 10 is connected to a low-pass filter 11, as known. The customary inductive-type speed sensors provide output signals which increase with increasing wheel speed. The low-pass filter 11, connected to the transducer 10, dampens frequencies at higher range, so that the signal obtained from the filter 11 is essentially linear. The low-pass filter 10, however, also suppresses disturbance signals so that threshold circuits, customarily included within the control unit 13, will not respond.

Under certain operating conditions, and particularly under the influence of out-of-round conditions within the transducer system of which the transducer 10 is a part, vibration, and the like, the transducer 10 and the low-pass filter 11 may form a resonance system. This is particularly so if the sensor or transducer 10 is periodically mechanically disturbed, for example due to vibration or other similar periodically recurring conditions. Resonance systems, as well known, cause substantial signal level increases. Under such conditions, thus, disturbance signals may be unduly enhanced, and may cause erroneous response of a threshold circuit within the control unit system 13.

In accordance with a feature of the invention, a high-pass filter 12 is connected to the low-pass filter 11, and selectively connectable in circuit with the low-pass filter 11 and the control unit 13. Of course, the control unit 13 will have similar signals applied thereto from the other wheels of the vehicle, as indicated by the broken connecting lines with the arrows leading to the control unit 13.

Switch 14 is provided for selective connection or disconnection of the high-pass filter 12. Switch 14 is operated in dependence on the output from an OR-gate 15. The OR-gate 15 is controlled by two output lines 16, 17 connected to the control unit 13. The output line 16 carries a signal derived from vehicle speed, and, if the speed drops below a predetermined minimum speed, OR-gate 15 is enabled to close switch 14. Line 17 carries a signal which is representative of response of the control unit 13, which may occur, for example, if one of the wheels of the vehicle is about to block, which may lead to skidding, as sensed by the control unit 13. If at least one of these two signals is present on lines 16, 17, OR-gate 15 is enabled and switch 14 will close. Under those conditions, then, the high-pass filter 12 is bridged, so that it will no longer influence signal processing from the transducer 10 and the filter 11 in the control unit 13. Thus, the high-pass filter 12 will be excluded from influencing the signal if the speed of the respective wheel, or vehicle speed—in dependence on the nature of the signal on the line 16—is below a predetermined reference level; or if the ABS unit 13 has responded. The reason for bridging the high-pass filter 12 is this: At low vehicle or wheel speeds, the output signals from the transducer 10 are low, and no additional attenuation by further circuit components of the signal should result; further, at low wheel or vehicle speeds, disturbance signals with relevant amplitude at the relevant frequency are not expected. Further, such disturbance signals usually do not occur during the time that the control unit of the anti-skid or anti brake-lock system has responded; any disturbance signals which occur during response of the control unit 13, can be suppressed by signal processing within the control unit, as well known.

FIG. 1 illustrates the simplest case in which the high-pass filter 12 is merely bridged or shunted by the switch 14. Other switching arrangements may be used and, of course, the switch 14 may be replaced by an electronic switch, such as a controlled semiconductor. Further, of course, the shunting circuit formed by switch 14 need not be of the ON/OFF type; rather, the effectiveness of the filter 12 can be decreased with decrease of vehicle or wheel speed, for example by attenuating the effect of the filter 12 by including in the parallel circuit a variable resistor which, in a limiting case, forms a continuous conductor, such as a transistor which provides a shunting path to the filter 12 of variable resistance, changing in dependence on the level of a control signal applied through an analog OR-gate 15 between a high or essentially blocked value, intermediate levels, to an essentially zero resistance or entirely conductive level.

Figure 2:
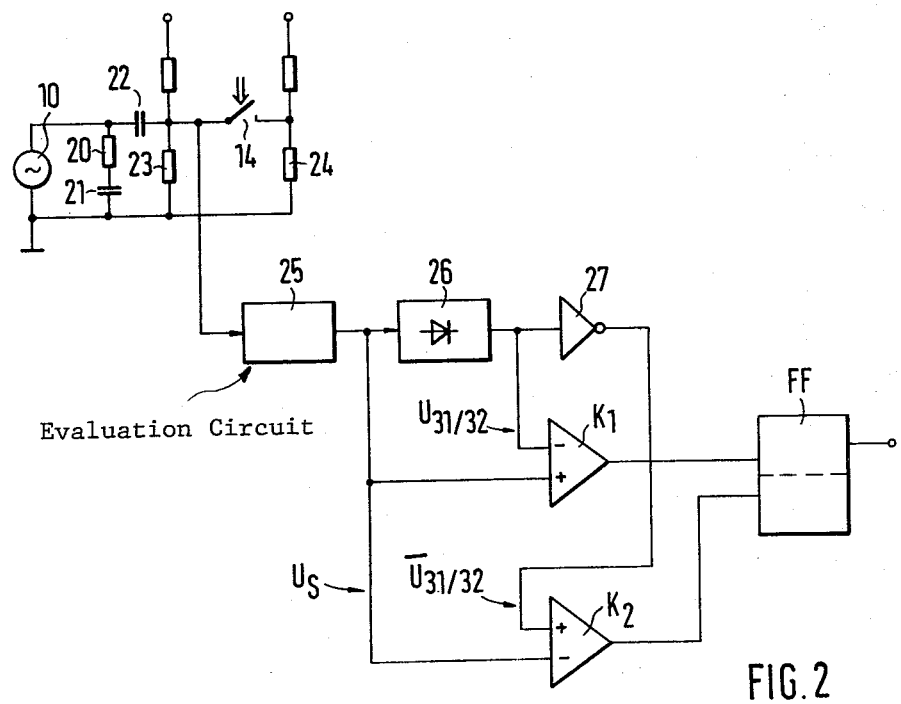
FIG. 2 is a detailed block diagram and illustrating a further embodiment.

FIG. 2 illustrates an embodiment in which the speed transducer 10 is connected to a low-pass filter formed by the series circuit of a resistor 20 and a capacitor 21. This low-pass filter is connected to a high-pass filter formed by a capacitor 22 and resistor 23. Switch 14 is provided to change the characteristics of the high-pass filter by, selectively, connecting a further resistor 24 in parallel to resistor 23 upon closing of switch 14. Of course, similar effects can be obtained by switching the capacitor 22. Switch 14 is shown only in symbolic representation and, of course, can be replaced by an electronic switch of the ON/OFF type, or of the gradually increasing resistance type, for example a transistor.

The output from the filter circuits 20, 21 and 22, 23, with or without connection of resistor 24, provides the filtered utilization signal, which is applied to an evaluation circuit 25. The output of the evaluation circuit 25 is connected to two threshold circuits $K_1$, $K_2$ connected as comparators. The output from evaluation circuit 25, thus, is connected to the direct input of an operational amplifier forming comparator $K_1$ and the inverting input of a second, and preferably similar operational amplifier forming comparator $K_2$. The output signal $U_S$ is, additionally, connected to a peak detector 26. The output from the peak detector 26 is connected to the inverting input of the first comparator $K_1$ and, further, through an inverter 27 to the direct input of the other comparator $K_2$. The outputs of the comparators $K_1$, $K_2$ are connected to the SET and RESET inputs of a flip-flop FF, respectively, as shown in FIG. 2.

Figure 3:
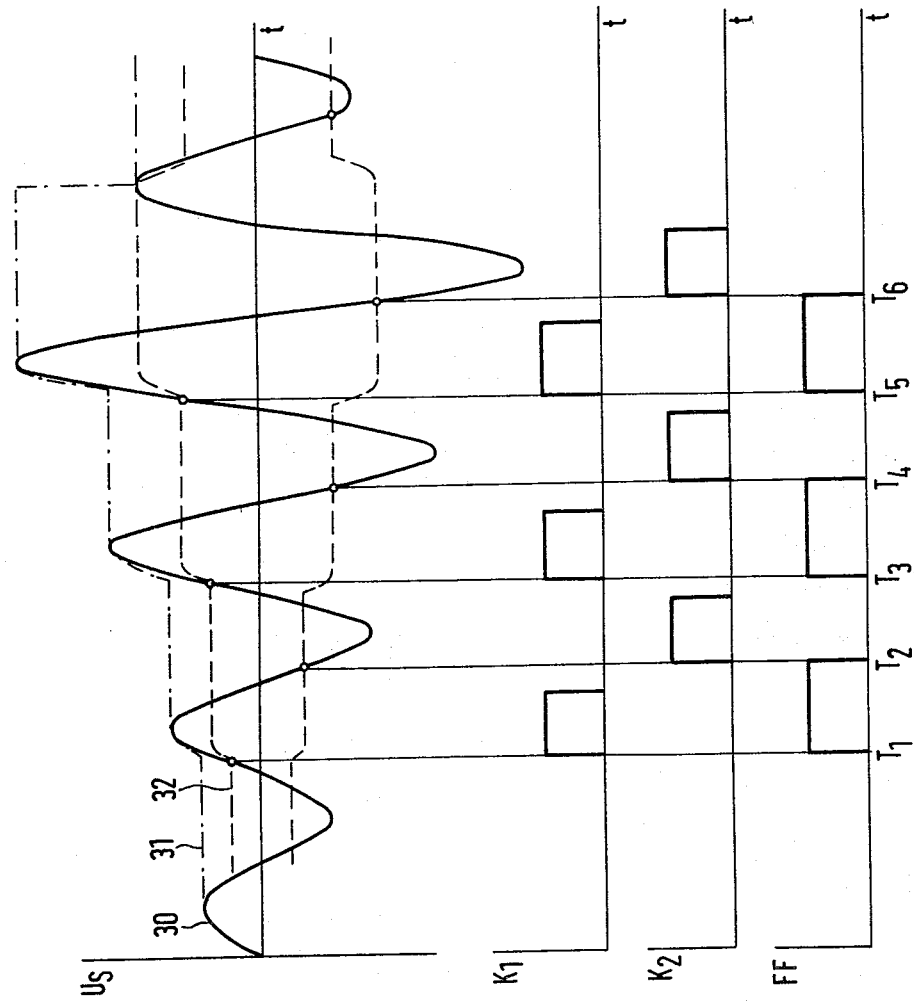
FIG. 3 is a series of graphs illustrating signals in the circuit of FIG. 2.

Operation, with reference to FIG. 3: The filtered sensor voltage $U_S$, derived from the evaluation circuit 25, is shown in the top graph of FIG. 3. The states of the comparators $K_1$, $K_2$ are shown in the next subsequent graphs, and the state of the flip-flop FF in the last line of the graphs of FIG. 3.

The circuit including components 26, 27, $K_1$, $K_2$ and FF is used to provide output signals representative of a threshold which changes with increasing signal amplitude. In order to obtain such a changing threshold, the peak value of the signal $U_S$ at the output of the evaluation circuit 25, as determined by the peak signal circuit 26, is sensed and stored for one signal undulation, as clearly seen in FIG. 3, see top graph $U_S$. The output signal of the peak value circuit 26 is shown at 31. This signal is connected to a weighting circuit, for example a voltage divider, which forms a weighted signal of somewhat smaller or lower value, to determine a threshold level which varies with the overall level or peak value of the signal being applied thereto, so that the threshold will change as a function of the peak value. The weighted signal is shown by broken line 32. The weighting of signal 31 to obtain signal 32 can be carried out directly within the peak value detector 26 or, separately, by suitable adjustment setting or biassing of the comparators $K_1$, $K_2$.

The graphs of FIG. 3 show input signals 30 of increasing amplitude, and hence an increasing threshold level. Of course, as the signals decrease, the threshold level likewise will decrease.

The comparators $K_1$, $K_2$ compare the weighted peak value of $U_S$—see broken line 32—with the instantaneous peak value of the signals, see chain-dotted line 31. Referring to FIG. 3: After the first undulation or period of $U_S$, the weighted value, line 32, is applied to comparator $K_1$. At time $T_1$, the second undulation reaches the value of line 32, causing the flip-flop FF to be SET. The flip-flop FF is RESET when the negative threshold in the second comparator $K_2$ is reached. This negative threshold, illustrated by a broken-line curve, is the inverse of the curve 32. As can be clearly seen, the curve 32, at time $T_2$, is at a greater difference level from zero or null than the curve 31 was at time $T_1$. Thus, the RESET time of the thresold $T_2$ now has considered the increase in signal amplitude of the second undulation above the peak value 30 of the first undulation. The signal voltage, prior to reaching the negative portion of the output signal, has passed through a maximum so that, in the time after $T_1$, the weighted value 32 has shifted, thus shifting the response value of the second comparator $K_2$. Thus, with response of the comparator $K_2$ at time $T_2$, the flip-flop FF is RESET.

The cycles will repeat between the times $T_3/T_4$ and $T_5/T_6$, respectively. As is clearly apparent from the graphs, the switching threshold of the comparators $K_1$, $K_2$ follows the signal voltage 30, and increases with increasing signal voltage level.

Any interference or disturbance or noise voltages, thus, are increasingly suppressed as the signal voltage increases, so that malfunction or erroneous response of the control unit 13 is thereby prevented. The output signal from the flip-flop FF is connected to the control unit 13, the circuit portion between the evaluation circuit 25 and the flip-flop FF being, for example, connected just in advance of the control unit 13.

Various changes and modifications may be made, and features described in connection with one of the embodiments may be used with the other, within the scope of the inventive concept.

The control unit 13 is well known in the literature and in industry, and could, for example, take the form described in U.S. Pat. No. 3,620,437.

The evaluation circuit 25 comprises DC-blocking means and potentiometer means for adjusting the trigger level of comparators $K_1$ and $K_2$.

We claim:
1. For combination with a vehicle having a wheel, and a brake therefor,
a wheel anti brake-lock or anti-skid system having
a speed sensor (10) coupled to a wheel of the vehicle and providing an output signal representative of the speed of rotation of the wheel;
a first filter (11) coupled to receive the output signal and providing a filtered signal;
a control unit (13);
and comprising, in accordance with the invention,
a second filter (12) having different pass characteristics from said first filter;
a switch (14) selectively connecting said second filter in circuit with the first filter and applying the output from said first filter to said control unit (13);
and means (15, 16, 17) for generating a control signal, selectively controlling operation of said switch connected to and responsive to a predetermined operating signal occurring within said control unit (13).

2. System according to claim 1, wherein said predetermined operating signal is a speed signal.

3. System according to claim 2, wherein said speed signal is a wheel speed signal.

4. System according to claim 2, wherein said speed signal is a vehicle speed signal.

5. System according to claim 1, wherein said predetermined signal is a response signal generated by said control unit (13) upon responding to possible brake lock of the wheel.

6. System according to claim 5, wherein said predetermined operating signal is a speed signal.

7. System according to claim 1, wherein the first filter (11) comprises a low-pass filter, and the second filter (12) comprises a high-pass filter.

8. System according to claim 7, wherein the high-pass filter (12) is formed as an R/C circuit (23, 22), and a further resistance element (24) is provided, the switch (14) selectively connecting said further resistance element in circuit with the resistance of the R/C circuit.

9. System according to claim 1, further including a threshold circuit ($K_1$, $K_2$) connected to the output of the second filter and to the control unit (13); and
means (26, 27) for sensing signal amplitude derived from said second filter circuit, said amplitude sensing means being connected to said threshold circuit to change the threshold response level thereof as a function of signal amplitude.

10. System according to claim 9, wherein the means for sensing signal amplitude comprises a peak detector (26) responding to peak signal level of the signal ($U_S$) applied thereto from the second filter;
and said threshold circuit comprises two comparators ($k_1$, $K_2$), one comparator ($K_1$) receiving the output from said peak signal detector directly, and the other comparator ($K_2$) receiving the output from the peak signal detector with inversion;
and a bistable response element (FF) connected to the outputs of the comparators, each comparator causing said bistable element to change switching state upon response of the respective comparator.

11. System according to claim 9, wherein said predetermined operating signal is a speed signal.

12. System according to claim 10, wherein said predetermined signal is a response signal generated by said control unit (13) upon responding to possible brake lock of the wheel.

13. System according to claim 10, wherein said predetermined operating signal is a speed signal.

* * * * *